United States Patent [19]
Herter

[11] 3,712,645
[45] Jan. 23, 1973

[54] BALL AND SOCKET PIPE JOINT

[76] Inventor: Martin Herter, Uhlandstrasse 74, 5 Koln 41, Germany

[22] Filed: Aug. 31, 1970

[21] Appl. No.: 68,220

[30] Foreign Application Priority Data

Sept. 8, 1969 Germany..................P 19 45 523.3

[52] U.S. Cl. ..................285/95, 277/2, 277/207, 285/45, 285/93, 285/165, 285/166, 285/167, 285/261, 285/351, 285/DIG. 1, 285/DIG. 11
[51] Int. Cl.............................................F16l 17/00
[58] Field of Search.......285/93, 95, DIG. 1, 261, 10, 285/166, 167, 110, 111, 112, 263, 165, 270, DIG. 11, 45, 331; 277/2, 207

[56] References Cited

UNITED STATES PATENTS

| | | | |
|---|---|---|---|
| 1,888,026 | 11/1932 | Chapman | 285/167 X |
| 3,454,288 | 7/1969 | Mancusi | 285/261 X |
| 2,421,691 | 6/1947 | Gibson et al | 285/DIG. 1 |
| 2,173,247 | 9/1939 | Bott | 277/207 X |
| 1,561,033 | 11/1925 | Spencer | 285/167 |
| 3,427,051 | 2/1969 | White et al. | 285/261 X |
| 3,433,504 | 3/1969 | Hones | 285/166 X |

FOREIGN PATENTS OR APPLICATIONS

| | | | |
|---|---|---|---|
| 906,197 | 9/1962 | Great Britain | 285/DIG. 11 |
| 996,228 | 6/1964 | Great Britain | 285/95 |

Primary Examiner—Dave W. Arola
Attorney—Burns, Doane, Swecker & Mathis

[57] ABSTRACT

A pipe joint with a ball socket, a ball pin, and a socket nut for connecting the socket and pin together. The fluid passage extending axially through the ball socket and ball pin are sealed against leakage around the socket nut by packing rings. The end of the ball pin that is received in the ball socket is flared outwardly to allow for angular movement of the pin relative to the socket. The existance of a seal between the flared end of the pin and the socket causes a pressure differential urging the ball and socket to move apart. In order to overcome this danger, a channel extends from the flow passage in the ball pin to the area between the socket and the pin to reduce the pressure differential tending to cause separation of the elements in the joint.

7 Claims, 11 Drawing Figures

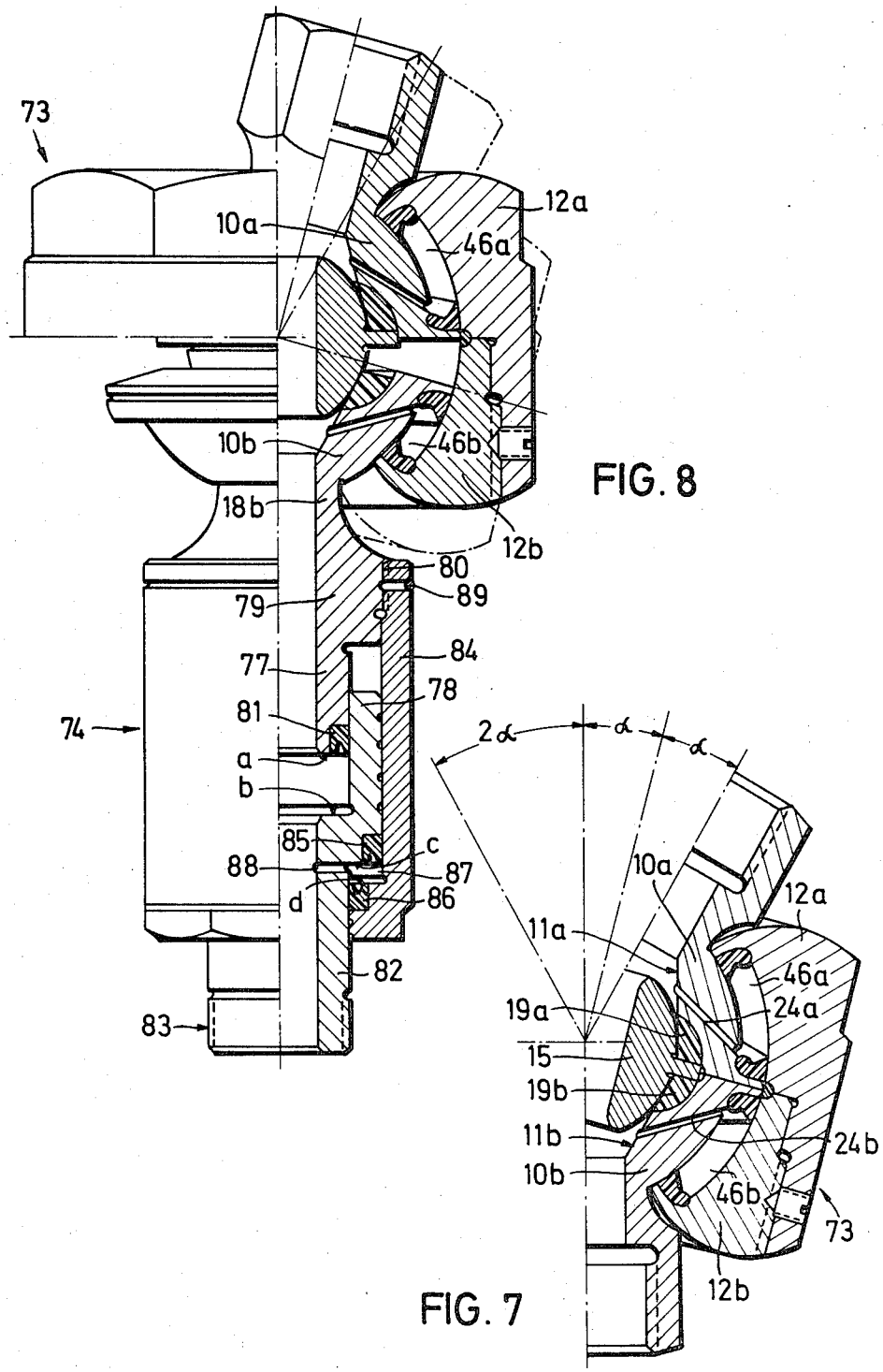

BALL AND SOCKET PIPE JOINT

BACKGROUND OF THE INVENTION

This invention relates to pipe joints and more particularly to ball and socket pipe connections.

Ball and socket pipe joint connections serve as a flexible, tight connection between two pipes through which a fluid passes. The fluid may be under high pressure or under a vacuum. In ball and socket pipe joint connections, the bore of the ball pin must be enlarged at the end adjacent the ball socket, so that the cross sectional area of the flow passage is not reduced when the two pipes are arranged at an angle with respect to each other. This enlargement of the ball pin bore produces surfaces on the ball and socket within the interior of the pipe joint connection which are in opposition to each other. These surfaces are arranged approximately at right angles to the direction of flow of fluid through the pipe joint connection.

Due to the pressure of the fluid flowing through the pipe connection, a force acts against each of the surfaces tending to separate the ball pin from the ball socket. The pressure of the fluid also presses the packing rings against the ball pin and the ball socket, thereby initially improving the packing effect, but if the pressure of the fluid flowing through the ball and socket connection is very high, the force acting between the ball pin and ball socket becomes so great that the two elements are unable to move relative to each other due to the high frictional resistance between the components. Even if the pressure is not so great as to prevent movement, any movement that occurs tends to cause excessive wear of the surfaces due to relative sliding between the ball pin and the ball socket. In conventional ball and socket joint connections, packing rings are used, but only when the pressure of the fluid is relatively low. Under these conditions, there is insufficient pressure to produce an effective seal between the packing ring and the ball and socket elements.

SUMMARY OF THE INVENTION

Accordingly, it is an object of this invention to provide improved ball and socket pipe joint connections.

A further object of this invention is to provide a ball and socket pipe joint connection that effectively seals against the leakage of fluid over a wide range of fluid pressures.

Another object of this invention is to provide a ball and socket pipe joint connection that is capable of large angular movement between the ball and the socket joint and which is not subject to friction locking due to high fluid pressures.

These objects are accomplished in accordance with the several preferred embodiments of the invention by providing additional internal surfaces which are exposed to the fluid flowing through the connection and which are positioned to oppose the forces exerted by the fluid on the conventional opposed surfaces of the ball and socket pipe joint connection. These additional surfaces counteract the effect of the fluid pressure which ordinarily would produce friction locking, so that the pipe joint connection is always readily movable, even at high internal pressures. In one preferred embodiment of the invention, a lateral ring chamber is provided between the ball pin and the ball socket and the socket nut which chamber is connected by channels in the ball pin with the fluid flowing through the pipe connection. In another embodiment of the invention, two ball pins are arranged within a two-part ball socket which also serves as the socket nut. In this arrangement, the ball pins each have a conical internal surface expanding outwardly to the median plane of the ball and socket connection. This internal surface is tightly engaged by an internal ring with a cylindrical inside bore and a spherical outside surface. Ring packings are inserted between the ball pin and the two-part ball socket to sear two annular chambers. A channel in each of the ball joint pins provides fluid communication between the flow passage in the respective pins and the external annular chambers.

In another embodiment of the invention, means is provided to compensate for changes in length between ball and socket pipe joint connections. The compensating means comprises two sleeves arranged in telescopically sliding relation with a ring packing between the sleeves. The longitudinal movement of the sleeves is limited by a cap screw. An annular chamber is provided between the cap screw and one of the sleeves. A channel in one of the sleeves communicates between the chamber and the interior of the sleeve through which fluid is conducted between the pipe joint connections. The opposed surfaces in the chamber are of substantially the same cross sectional area.

This compensating means can be arranged at one or both ends of the ball and socket pipe connection, with one sleeve connected with the ball pin or the ball socket and the other sleeve being connected with the pipe line. In a preferred embodiment, however, the compensating means within the pipe connection is provided by the inner ring being split and shaped in such a way that the inner ring portions form the telescopically engaging sleeves, while the ball socket which constitutes the socket nut is divided so that one portion engages the screw cap of the compensating means while the other portion engages the corresponding inner ring portion.

Functions, characteristics, and advantages of the invention are contained in the following description of several embodiments, which are not to be construed as limitations of the invention. It is recognized that variations and changes may be made therein without departing from the invention as set forth in the claims.

DETAILED DESCRIPTION OF THE DRAWINGS

These several preferred embodiments are illustrated in the accompanying drawings in which:

FIG. 7 is a detail view of the pipe joint connection of FIG. 6, but showing the pin elements displaced from their position in FIG. 6;

FIG. 8 is an elevational view, partially in cross section showing another embodiment of the invention including the longitudinal compensating means;

DESCRIPTION OF PREFERRED EMBODIMENTS

Figure 1:
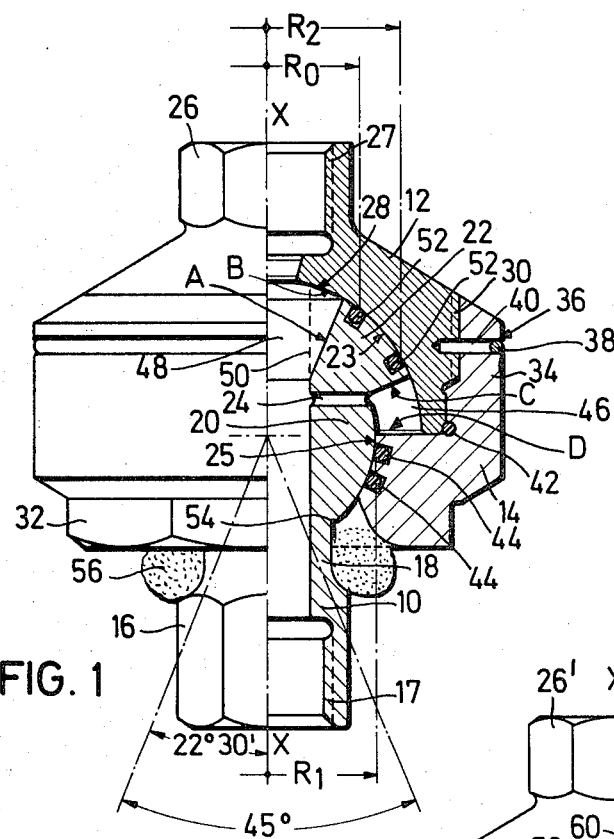
FIG. 1 is an elevational view, partially in cross section, of one embodiment of the ball and socket pipe joint connection of this invention.

Referring to FIG. 1, the ball and socket pipe joint connection comprises a ball pin 10, a ball socket 12 and a socket nut 14. Each of these three elements have a central bore that is aligned with the longitudinal axis X—X.

The ball pin 10 has a hexagonal external surface 16 and an internal threaded portion 17 for connection with a pipe line. A net portion 18 of the ball pin extends between the hexagonal portion 16 and the ball portion 20. The ball pin includes an annular projection 22 adjacent the ball portion 20. The projection 22 has a partial spherical surface 23 having a diameter that is greater than the diameter of the spherical surface 25 of the ball portion 20. Within the annular projection 22, there are channels 24 which establish communication between the inner flow passage of the ball and socket pipe joint connection and the outside of the ball portion 20 adjacent the annular projection 22.

The ball socket 12 has a hexagonal sleeve portion 26 which has internal screw threads 27 for connection with a pipe line. Of course, the sleeve portions 16 and 26 may be externally threaded for connection with internally threaded pipe flanges, or other suitable pipe connections can be provided.

The socket portion 28, which is adjacent to the sleeve portion 26 is provided with an external thread 30. The socket surface 28 cooperates with the spherical surface 23 of the annular projection 22. The socket nut 14 is provided with a hexagonal ring portion 32 and an internally threaded sleeve portion 34 which forms a screw connection with the external threads 30 on the socket 12. The socket nut 14 has a socket ring surface which cooperates with the surface 25 of the ball portion 20. An annular groove 36 is provided in the socket nut. After the nut has been screwed on to the socket 12, a guard ring 38 is inserted in the groove 36 to retain a pin 40 which extends through aligned bores in the nut 14 and the socket 12. A packing ring 42 is provided between the socket nut 14 and the socket 12.

Packing rings 44 are positioned in annular grooves 45 provided in the internal surface of the nut 14. Additional packing rings 52 are mounted in circular grooves in the partial spherical surface 23 of the projection 22. Preferably, the rings 52 are formed of resilient material to provide a cushioning effect in addition to sealing the cooperating surfaces.

The bore of the ball pin must have a larger diameter at its end, so that when the ball pin is angularly displaced relative to the ball socket, the diameter of the flow passage is not restricted. As shown in FIG. 1, the dotted line 50 represents schematically the inside boundry of the annular chamber 48 produced by the enlargement of the bore of the ball pin 10. When a fluid under pressure is present in the pipe connection, the fluid exerts a pressure on the ball pin 10 and in the direction of the arrow A, and upon the ball pin 12 in the direction of the arrow B, which tends to drive the ball pin and socket elements apart. In the pipe joint connection of this invention, this effect is compensated by an annular chamber 46 provided outside the ball portion 20. The annular chamber 46 is exposed to fluid at the pressure in the bore of the pin through the channels 24. Therefore, the pressure of the fluid in the chamber 46 is exerted against the side of the annular projection 22 in the direction of the arrow C and against the socket nut in the direction of the arrow D. The resultant forces on the ball pin 10 and the socket 12 are thereby substantially reduced. As a result, even at high internal pressures, the ball and socket pipe joint connection of this invention remains readily movable.

At the base of the ball pin portion 20, a circular groove 54 is provided in the ball pin 10. A ring 56 of resilient and absorbent material, such as foam material is inserted within the groove 54, as shown in FIG. 1. The ring 56 envelops the neck portion 18 and substantially fills the space between the socket nut 14 and the neck portion 18, but leaves the annular space between the socket nut and the ball portion 20 free, so as not to impare the motion of the ball and socket components.

The ring 56 has several functions. It prevents dust or dirt from entering the interior of the pipe joint connection, thus protecting the components from the abrasive action of dust or dirt. Due to its resiliency, the ring 56 does not obstruct the movement of the ball pin relative to the ball socket. If the ball and socket pipe joint connection should leak, the fluid is absorbed by the absorbant ring 56. Therefore, when the ring 56 is compressed and found saturated with fluid, it is an indication that the pipe joint connection is leaking. If the ring 56 were not present, it would be much more difficult to discover that the joint connection is leaking, since the escaping fluid would flow along the pipe and the leak could not easily be located.

In FIG. 1, the radius at which the inner ring 52 contacts the spherical surface 28 it is indicated as $R_0$ and the radius at which the outer ring 52 contacts the spherical surface 28 is indicated at $R_2$. The radius at which the packing ring 44 engages the spherical surface 25 of the ball pin 20 is indicated at $R_1$.

Since the basic structure of the ball and socket pipe joint connection of this invention has been described with respect to the embodiment of FIG. 1, elements in the embodiments of FIGS. 2 and 3, and FIGS. 4 and 5 have the same reference numeral as in FIG. 1, but are distinguished by the addition of a prime (i.e., 12') and a double prime (i.e., 12''), respectively.

Figure 2:
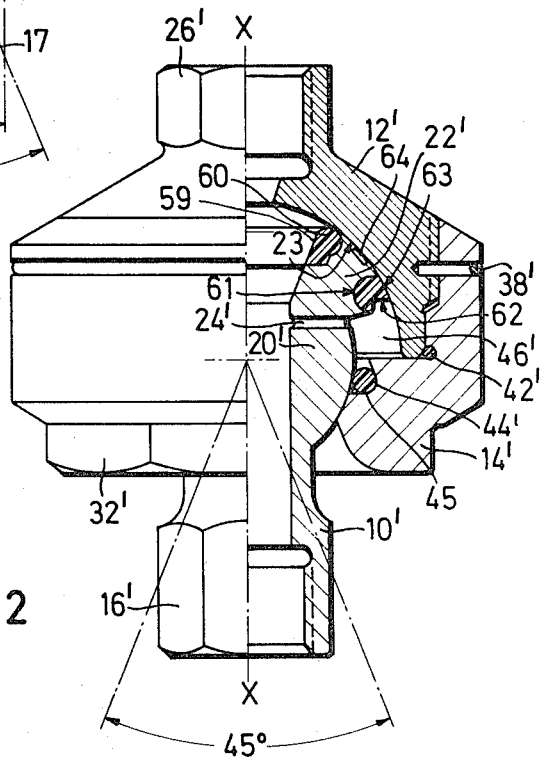
FIG. 2 is an elevational view, partially in cross section of another embodiment of the pipe joint connection.
Figure 3:
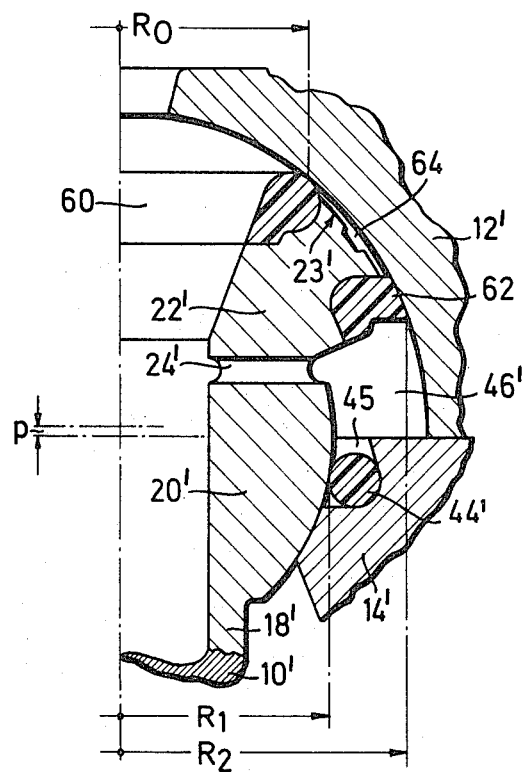
FIG. 3 is an enlarged detail view of the pipe connection of FIG. 2.

The embodiment of FIGS. 2 and 3 differs from the embodiment of FIG. 1 essentially in that the packing rings 52 in FIG. 1 are arranged within the spherical surface 23, while in FIGS. 2 and 3, the packing rings are positioned along the edges of the spherical surface 23. The packing rings 60 and 62 deform when exposed to pressure differential resulting in a small radius indicated at $R_0$ and a large radius indicated a $R_2$. The pressure of the fluid improves the sealing effect of the rings 60 and 62. Packing ring 60 is a sealing ring (O-ring) with a conical flange 59. The packing ring 62 is a labial seal with a quadrantal seat 61 and a spherical lip 63. A collector ring groove 64 to receive fluid that leaks past the rings 60 and 62 is provided in the spherical surface 23'. An annular groove 45 is provided in the socket nut 14' to hold a packing ring 44'. The packing ring 44' not only prevents leakage of fluid along the ball pin portion 20, but also serves as a cushioning element for the ball pin 20.

Figure 4:
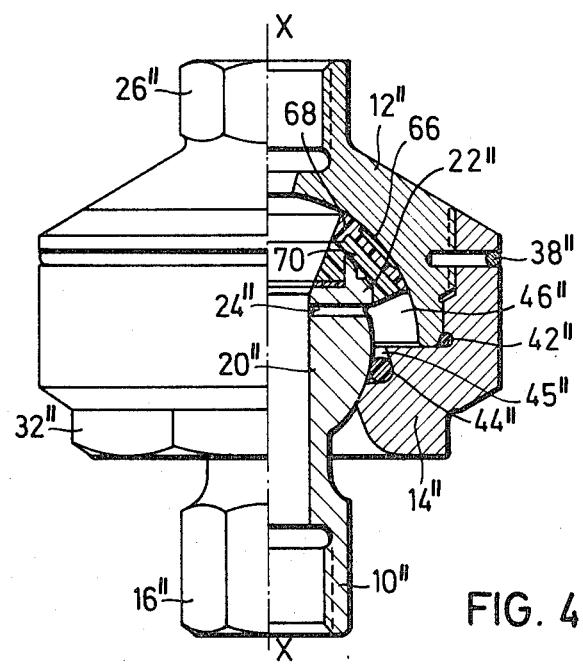
FIG. 4 is an elevational view, partially in cross section of a third embodiment of the pipe joint connection.
Figure 5:
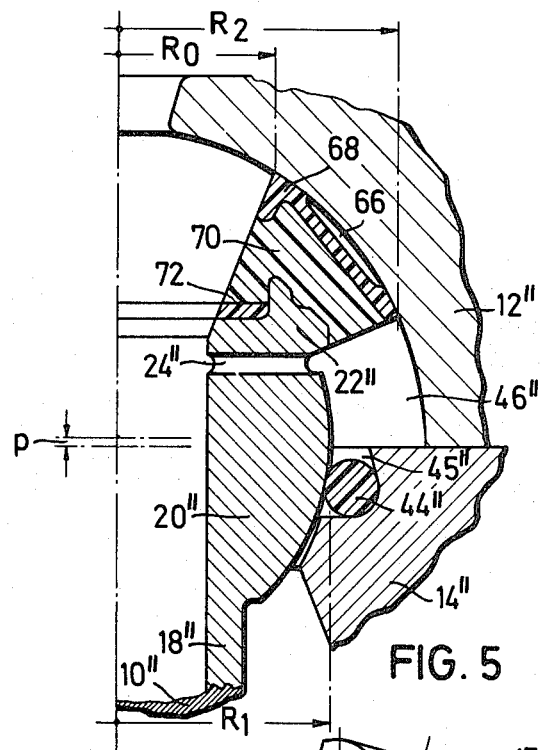
FIG. 5 is an enlarged detail view of a portion of the connection shown in FIG. 4.

The embodiment shown in FIGS. 4 and 5 differs from the embodiment of FIGS. 2 and 3 in that the annular projection 22" is formed with a circular flange on which a support ring 70 is mounted. A packing ring 68 is mounted on the support ring 70, as shown in FIG. 5. The edges of the ring 68 bear against the spherical surface of the socket member 12" and perform the same function as the individual packing rings of the embodiments of FIGS. 1 and 2. An annular space 66 is provided between the edges of the ring 68 for receiving fluid that enters between the edges of the ring 68. To prevent the entry of fluid into the boundary surface between the annular portion 22" and the support ring 70, an additional packing ring 72 is provided.

The packing rings 44', 44'', 52, 60, 62 and 68 are preferably formed of an oil proof resilient material having a Shore hardness of about 75° to 90°, and such materials include chlorinated rubber, silicon rubber, polyvinyl chloride, phenolic resin, polyethylene, polypropylene, polyamide, and polytetrafluorethylene. The support ring 70 preferably has a Shore hardness exceeding 95°, and examples of such material include polypropylene, polyamide, polytetrafluorethylene, fluorinated ethyl propylene, or the like, which materials may include fillers such as glass fibers, graphite, and molybdenum bisulfide.

Figure 6:
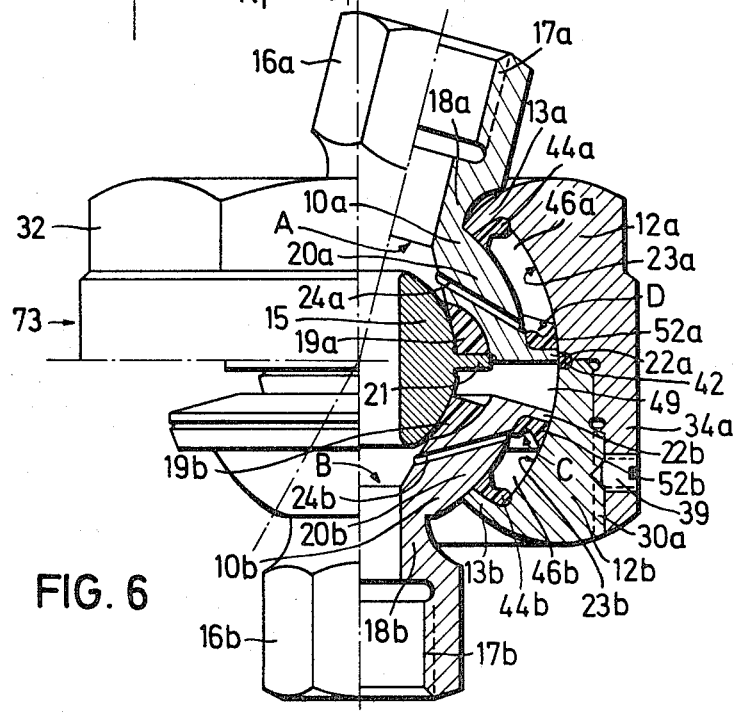
FIG. 6 is an elevational view, partially in cross section of a fourth embodiment of the pipe joint connection.

Another embodiment of the ball and socket pipe joint connection of this invention is illustrated in FIGS. 6 and 7 in which the degree of angular movement between the axes of the pipes may be as much as 60°. In the description of the structure of this embodiment, the same reference numerals that were used in describing the corresponding elements of FIG. 1 have been used in the description of FIGS. 6 and 7, with the addition of a letter. The pipe joint connection of FIGS. 6 and 7 includes two ball pins 10a and 10b arranged in a ball socket. The ball socket comprises a pair of socket rings 12a and 12b which also constitute the socket nut. Ball pins 10a and 10b include hexangonal sleeve portions 16a and 16b with internal threads 17a and 17b for connection with pipe lines. The ball pins also include a neck portion 18a and 18b and end portions 20a and 20b, which have angular projections 22a and 22b with spherical outer surfaces. The radius of each projection 22a and 22b is greater than the corresponding radius of the ball portion 20a and 20b, and corresponds to the radius of the internal spherical surface 23a and 23b of the ball socket. Socket elements 12a and 12b have annular projections 13a and 13b with exterior surfaces that are spherical and have a radius along the inner edge which corresponds to the radius of the ball portion 20a and 20b. Packing rings 44a and 44b tightly engage the ball portions 20a and 20b and are arranged to rest against the projections 13a and 13b. The projections 13a and 13b, and 22a and 22b form between them annular chambers 46a and 46b which are sealed by packing rings 52a and 52b adjacent the annular projections 22a and 22b, respectively. These annular chambers 46a and 46b are connected through the channels 24a and 24b with the interior of the ball and socket pipe joint connections, so that the fluid pressure in these annular chambers is the same as the pressure in the central passages of the ball pin elements 10a and 10b.

The ball and socket element 12a has an internally threaded ring portion 34, while the socket element 12b has a corresponding external threaded portion 30a for securing the socket elements together. A set screw 39 blocks the socket elements 12a and 12b against relative rotation.

The internal bore of the pin elements 10a and 10b each has a conical portion 11a and 11b and an internal ring 15 is inserted between the ends of the pin elements. The ring 15 has a cylindrical internal bore and a spherical outer surface which engages the respective conical surfaces 11a and 11b of the ball pins. Suitable packing rings 19a and 19b are provided on the pin elements and engage the spherical surface of the ring 15. A central rib 21 projects outwardly around the external circumference of the ring in position to engage the packing rings 19a and 19b. When the pins 10a and 10b are in the position shown in FIG. 6, an annular space 49 is provided between the ring 15 and the socket elements 12a and 12b. Fluid in the space 49 is expelled when the volume of the space decreases, for example in moving from the position shown in FIG. 6 to the position shown in FIG. 7, by passing between the sealing rings 52a and 52b and entering the chambers 46a and 46b. Fluid may also be expelled by passing between the packing rings 19a and 19b and the surface of the ring 15.

In the pipe joint connection illustrated in FIGS. 6 and 7, the pressure forces A and B acting upon the enlarged surfaces 11a and 11b in the bore of the ball pin would normally produce high frictional forces resisting pivoting movement of the ball pin, are, in accordance with this invention, compensated by counteracting forces C and D acting against the annular projects 22a and 22b due to the presence of fluid in the chambers 46a and 46b. Also, the swivel angle between the ball pins is greater than in the embodiments of FIGS. 1 to 5 and can be as great as 60°. The degree of pivoting movement of the pins and the socket elements, and the ring 15 can be seen by comparing FIGS. 6 and 7.

Figure 9:
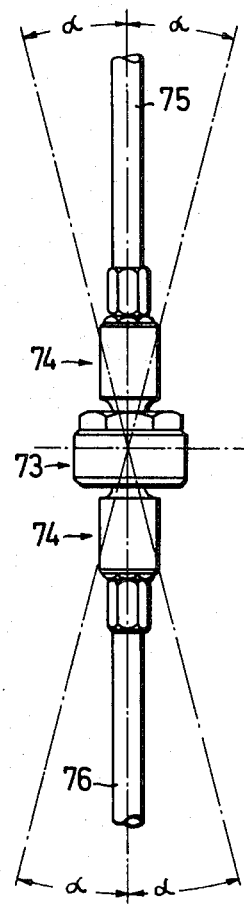
FIG. 9 is a schematic view of the pipe joint connection of FIG. 8 as connected between axially aligned pipes.
Figure 10:
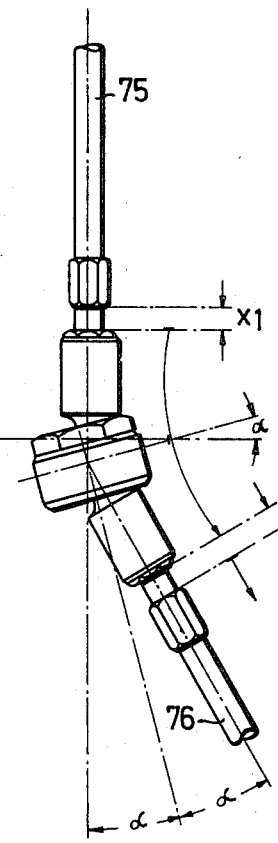
FIG. 10 is a schematic view as in FIG. 9, but showing the pipes angularly displaced relative to each other.

Referring now to FIG. 9, two pipes 75 and 76 are shown as connected together by a ball and socket pipe joint connection 73 which corresponds to the embodiment of FIGS. 6 and 7. In FIG. 9, the pipes 75 and 76 are aligned axially, while in FIG. 10, pipe 76 is displaced by an angle $2\alpha$ with respect to pipe 75, causing longitudinal displacement, which in a rigid pipe system must be compensated. The longitudinal displacement is shown schematically in FIG. 10 by the dimension $x1$ and $x2$ and is made possible by compensating elements 74 which, as shown in FIGS. 9 and 10 are arranged on opposite ends of the pipe connection 73. In the embodiment of FIG. 8, the longitudinal displacement compensating element 74 is illustrated. Both compensating elements 74 illustrated in FIG. 9 are substantially identical and therefore only the lower element 74 is illustrated in FIG. 8. Of course, the compensating element 74, as shown in FIG. 8 can be formed integrally with the ball pin elements of the embodiments of FIGS. 1 to 5.

The longitudinal displacement compensating element 74 is pressure compensated so that the internal pipe line pressure does not interfere with compensation of longitudinal displacement. The compensating element 74 comprises two sleeves 77 and 78 which are capable of sliding relative to each other in telescoping relation. The sleeve 77 is integral with the neck portion 18b of the ball pin element 10b and has an annular flange 79 with external screw threads 80. The sleeve 78 slides on the exterior of the sleeve 77 and a packing ring 81 is provided in an annular groove in the sleeve 77. The sleeve 78 includes an extension 82 having a smaller diameter and having external screw threads 83 for connection with the pipe line 76. A cover 84 is telescoped over the sleeve 78 and has internal threads which cooperate with the threads 80 on the sleeve 77 at one end and the other end overlaps a shoulder on the sleeve 78. Packing rings 85 and 86 are provided in corresponding annular grooves of the sleeve 78 and the cover 84 and thus seal an annular space 87. Fluid passes through the sleeve extension 82 by means of a passage 88 from the central passage of the compensating element 44. A safety ring 89 prevents unintentional unscrewing of the cover 84 from the sleeve projection 79. When a fluid is flowing under pressure through the compensating element 74, the pressure of the fluid is applied against the sleeve 77 in the direction of the arrow *a* and against the sleeve 78 in the direction of the arrow *b*, which tends to displace these components axially apart. Fluid under pressure, however, also passes through the passage 88 into the chamber 87 to apply a force *c* against the sleeve 78 and a force *d* against the cover 84. Due to the rigid connection between the cover 84 and the sleeve 77, the downward force *d* counteracts the upward force *a*, as viewed in FIG. 8, while the upward force *c* counteracts the downward force *b*, and therefore the sleeve 78 can move longitudinally relative to the sleeve 77 substantially independently of the internal pressure.

Figure 11:
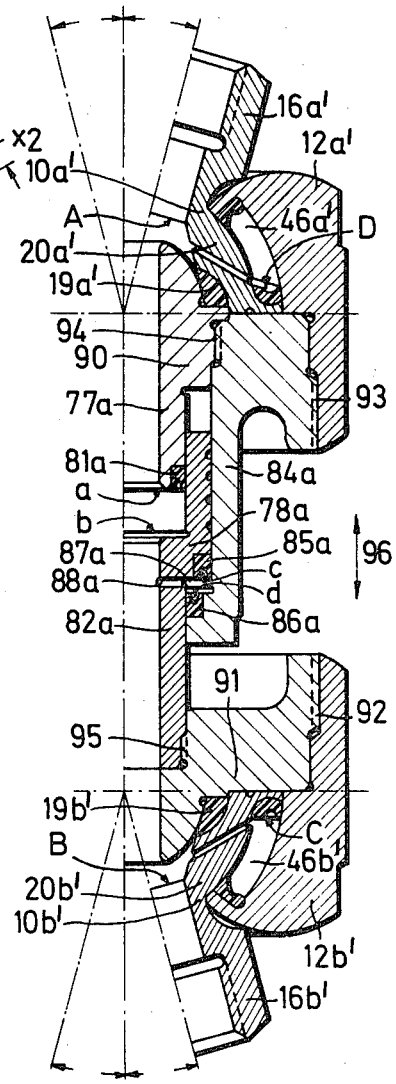
FIG. 11 is a cross sectional view of a further embodiment of the invention showing the longitudinal deformation compensating means positioned between two ball and socket pipe joint connections.

Although the longitudinal displacement compensating element 84 is arranged outside the ball and socket pipe joint connection 73, it may also be arranged within the pipe joint connection, as illustrated in the embodiment of FIG. 11. Corresponding elements have the same reference numeral as in FIG. 8, except that the modified longitudinal displacement compensating element components are designated by the numeral followed by the letter *a*, while the components of the pipe joint connection have the respective numerals and letter followed by a prime symbol (i.e. 12a'). In FIG. 11, the pipe joint connection has two ball pins 10a' and 10b' arranged in ball socket elements 12a' and 12b'. The compensation of forces in the pipe joint connection is achieved by the arrangement of annular chambers 46a' and 46b' wherein the counterforces C and D compensate the forces A and B. In contrast to the embodiment of FIGS. 6 and 7, the embodiment of FIG. 11 is formed in such a way that the internal ring which engages the packing rings 19a' and 19b' in the conical bore of the ball pin elements is divided into two separate portions 90 and 91, and the socket elements 12a' and 12b' do not engage each other directly. The ball socket elements 12b is screwed into the internal ring element 91 by means of screw threads 92, while the socket element 12a' is secured by means of threads 93 to the cover 84a which is threadedly secured to the internal ring 90 by screw threads 94. The sleeve 78a of the compensating element has its extension 82 threadedly secured to the other ring element 91 by means of screw threads 95. The sleeve 77a which is integral with the ring 90 is telescopingly received within the sleeve 78a. Packing rings 81a, 85a and 86 a are provided to seal the sleeve 78a with respect to adjacent surfaces. The annular space 87a is connected with the interior of the sleeve 78 by a passage 88a. It can be seen that compensation can be achieved by longitudinal displacement of the sleeve 78 in the direction of the arrow 96, since the forces *b* and *c* acting upon the sleeve 78 a compensate each other, while the forces *a* and *d* act upon the elements which are rigidly connected together by the threads 94.

Of course, the invention is not limited to the details of the embodiments disclosed herein, which serve merely as explanation of the invention and not to limit the concept of the invention. It is recognized that the ball and socket pipe joint connection of this invention remains very readily movable at extremely high pressures or vacuums and operates essentially without leaking. The dimensions of the pipe connection are substantially smaller than those of comparable conventional pipe connections. Furthermore, the pipe connection of this invention can be utilized for a wide range of pressure or vacuum conditions and exhibits only slight wear, so that only minimum maintenance is required. The cross sectional shape of the packing rings is such that as the packing rings tighten, they become correspondingly stronger with increasing pressure, so that stress on the packing rings is only as great as is required for the functioning of the joint connection and unnecessary wear of the packing rings is avoided.

The longitudinal displacement compensating means is balanced for pressure or vacuum conditions so that the necessary changes in length when the ball and socket joint is pivoted can be achieved without excessive resistance. The pipe joint connection also provides an efficient protection against the entry of dust between the highly polished spherical surfaces of the ball pin and ball socket, which is further protected to permit the discovery of possible leakage.

Since the pipe joint connection of this invention reduces the disadvantageous effects of internal fluid pressure, it is possible to increase the size of the ball pin and to widen the pivoting angle between the ball pin and the socket nut components. Furthermore, the use of two ball elements permits the pivoting angle to be greatly increased, while the internal ring provides the necessary internal packing between the ball pins as they move relative to each other. It should be noted that the tight abutment between the spherical and conical surfaces can be achieved more easily and simply than a tight engagement between two spherical surfaces.

What is claimed is:

1. A ball and socket pipe joint connection comprising:

a ball pin member having a central bore therein and having an external annular projection adjacent the outlet of said bore, said ball pin member also having an external ball surface spaced from the outlet of said bore;

a socket member having a spherical surface cooperating with said annular projection, the radius of said spherical surface being greater than the radius of said ball surface;

a connecting member secured on said socket member and having a spherical surface cooperating with said ball surface;

first fluid sealing means on said annular projection and movable with said annular projection for sealing between said projection and said spherical surface of said socket member, said first fluid sealing means including an annular packing ring, said packing ring engaging said socket member surface at radially spaced locations and having a central annular recess between said loations, said packing ring being mounted on a support ring of greater hardness than the packing ring, the support ring and said packing ring cooperating to form said annular projection;

second fluid sealing means between said connecting member and said ball member, said ball member and said socket member and said connecting member cooperating to form a fluid receiving chamber externally of said ball member and between said first and second sealing means; and means for conducting fluid into and out of said chamber.

2. The ball and socket pipe joint connection according to claim 1 including a ring of resilient absorbent material interposed between said ball pin member and said connecting member, whereby fluid leaking between said connecting member and said ball pin member is absorbed within said material.

3. A pipe joint connection comprising:

a pair of rings joined together to form a common continuous internal spherical surface;

a pair of ball pin elements received within said rings, said ball pin elements each having a central bore therein and said bores having an outlet opening in substantially opposing relation to each other and within said spherical surface, said pin elements each having an external spherical surface, substantially concentric with said internal spherical surface of said rings;

said rings each having an internal projection engaging said external spherical surface of the corresponding pin element, said pin elements each having an external projection engaging said internal spherical surface;

seal means between all of said projections and the adjacent spherical surface, thereby defining a separate annular chamber on the exterior of each ball pin element;

passage means communicating between said bore in said respective pin elements and said chambers; and retainer means positioned in said outlet openings of said bores to maintain said ball pin elements spaced apart within said rings, said retainer means being movable independently of said rings and said seal means.

4. The pipe joint connection according to claim 3 wherein said retainer means includes a ring having a radial flange extending between said pin elements, said bore of each pin element having a conical section, said ring having a spherical surface in engagement with the conical sections of the respective bores.

5. The pipe joint connection according to claim 4 including sealing rings on said pin elements, said sealing rings forming at least a portion of said conical portion.

6. The pipe joint connection according to claim 3 including extensible conduit means joined with one of said pin elements, said extensible means including a pair of sleeves movable longitudinally relative to each other, said sleeves forming a fluid conduit communicating with the bore of said one pin element, and means for counteracting fluid pressure in said bore tending to urge said sleeves to move longitudinally relative to each other, whereby said extensible means operates substantially independently of fluid pressure in said bore.

7. The pipe joint connection according to claim 6 wherein said sleeves include a first pair of opposed fluid responsive surfaces arranged for urging said sleeves to move longitudinally in one direction, and include a second pair of opposed fluid responsive surfaces arranged for urging said sleeves to move longitudinally in the opposite direction, whereby said sleeves provide longitudinal compensation for swivelling movement of said pin elements independently of fluid pressure.

* * * * *